Figure 1:
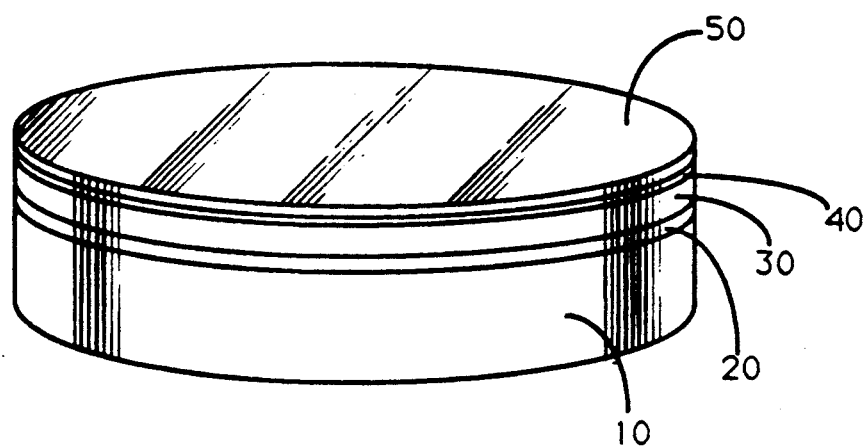

United States Patent
Zito

[11] Patent Number: 5,208,704
[45] Date of Patent: May 4, 1993

[54] ULTRALIGHT MIRRORS

[76] Inventor: Richard R. Zito, 330 N. Mathilda Ave. (#606), Sunnyvale, Calif. 94086

[21] Appl. No.: 798,287

[22] Filed: Nov. 25, 1991

[51] Int. Cl.$^5$ .............................................. G02B 5/08
[52] U.S. Cl. ...................................... 359/848; 359/883
[58] Field of Search ........................ 359/846, 848, 883

[56] References Cited

U.S. PATENT DOCUMENTS

| | | | |
|---|---|---|---|
| 3,912,380 | 10/1975 | Klein | 359/848 |
| 3,985,429 | 10/1976 | Fleischer | 359/848 |
| 4,035,065 | 7/1977 | Fletcher et al. | 359/848 |
| 4,388,344 | 6/1983 | Shuskus et al. | 359/883 |
| 4,433,045 | 2/1984 | Gowan et al. | 359/845 |
| 4,444,467 | 4/1984 | Shuskus et al. | 359/883 |
| 4,451,118 | 5/1984 | Stalcup et al. | 359/845 |
| 4,451,119 | 5/1984 | Meyers et al. | 359/883 |
| 4,554,197 | 11/1985 | Chyung et al. | 264/60 |
| 4,671,911 | 6/1987 | Garnier et al. | 264/60 |
| 4,791,076 | 12/1988 | Leggett et al. | 359/848 |
| 4,814,232 | 3/1989 | Bluege et al. | 359/883 |
| 4,822,157 | 4/1989 | Stout | 350/629 |
| 4,875,766 | 10/1989 | Shimodaira et al. | 359/883 |
| 4,963,012 | 6/1990 | Tracy et al. | 350/641 |
| 4,990,378 | 2/1991 | Jones | 427/420 |

FOREIGN PATENT DOCUMENTS 1231234 5/1971 United Kingdom ................. 359/883

OTHER PUBLICATIONS

B. Abt, G. Helwig, D. Scheulen, "Composite Technology for Lighweight Optical Mirrors," SPIE vol. 1236 pp. 696-705.
H. Hugenell, "Design of the Central-Axis Reflector [ZAS] and Results Leading to the Off-Axis Reflector," SPIE vol. 1236 pp. 250-265.
J. F. Creedon, Y. D. Izu, W. H. Wheeler, "Strength and Thermal Stability Improvements of Fibrous Ceramic Composites", SAMPE Quaterly, Oct. 1983, pp. 9-15.
R. R. Zito, "A Method of Making Ultralight Primary Mirrors," SPIE vol. 1494 pp. 491-497.

*Primary Examiner*—Bruce Y. Arnold
*Assistant Examiner*—R. D. Shafer

[57] ABSTRACT

An ultralight mirror which utilizes a light weight fibrous substrate (10), made of a tangle of silica and alumina fibers, which support a set of thin layers that form the mirror surface. These layers, from the bottom to the top, are a sealant layer (20) to plug substrate surface voids, a polished glassy layer (30), a reflective layer (40), and a protective overcoat (50).

3 Claims, 1 Drawing Sheet

ULTRALIGHT MIRRORS

BACKGROUND

1. Field of Invention

The object of this patent application is to describe a method of producing large mirrors which are very light for Earth based and space based telescopes, as well as other types of optical systems where lightweight reflective optics are an asset.

BACKGROUND

2. Description of Prior Art

Telescope designers are constantly seeking new light, rigid, materials for use as primary mirrors. Light mirrors mean less sagging so that larger mirrors can be made which hold their figure. Nowhere, however, is the demand for light mirrors more critical than for space telescope designs. Each additional kilogram lifted to low Earth orbit requires a concomitant 20 kilograms in vehicle weight and fuel (*Technical Program Information, Innovative Science and Technology Office/SDIO*, p. 37, 1988). Furthermore, the use of space based multimirror telescope designs further aggravates the mirror weight problem. Solutions to the weight problem include the use of inflatable lenticular structures with one transparent surface and a reflective layer on the concave surface (T. R. Staut, 1989, U.S. Pat. No. 4,822,157). Other solutions involve the use of thin flexible mirrors (C. E. Tracy and D. K. Benson, 1990, U.S. Pat. No. 4,963,012), fiber composite technology mirrors (B. Abt, G. Helwig, D. Scheulen, "Composite Technology for Lightweight Optical Mirrors," SPIE vol. 1236 p. 696–705), and mirrors with a reflective layer supported by a substrate having a honeycomb structure (H. Hugenell, "Design of the Central-Axis Reflector [ZAS] and Results Leading to the Off-Axis Reflector," SPIE vol. 1236, Feb. 12–16, Tucson AZ, p. 250–265). All of these designs have serious drawbacks. First of all, inflatable mirror designs do not produce optically precise figures accurate to a small fraction of a wavelength. Furthermore, condensation of the inflating gas on the optical surfaces during cold space operations can totally destroy image quality. Flexible mirrors having metal or glass substrates are good image forming components, but require an extensive array of electromechanical transducers to hold there figure. Such an array adds both weight and complexity to a telescope. Furthermore, thin glass mirrors are extremely susceptible to shattering by micrometeoroid bombardment in the space environment, and metal mirrors can tarnish very rapidly due to the presence of a tenuous, corrosive, residual atmosphere of atomic oxygen in low Earth orbit. Some metal mirrors can also change there figure substantially due to the changing thermal environments in Earth orbit. Like metal mirrors, carbon fiber reinforced plastic mirrors can also be attacked severely by atomic oxygen in low Earth orbit and are not as thermally stable as glass mirrors. Composite polymer mirrors can also outgas species which can condense on the surface of the mirror. Honeycomb substate mirrors are rigid, and certainly lighter than mirrors having a solid substrate; but they are still far heavier than mirrors made by the technology described in this application.

In this patent application the fabrication of an ultralight mirror is described which utilizes a substrate made of a rigid fibrous material. Such substrates are very light and have a density of only about 0.2 gms/cm$^3$; much lighter than even the honeycomb substrate mirrors. Experiments have shown that void volumes as high as 97% can be reached. Unlike solid, honeycomb, or thin flexible mirrors, mirrors made with a fibrous substrate tend not to shatter when struck by micrometeorites in the space environment. Instead, micrometeorites dissipate there energy by breaking, pulverizing and vaporizing individual fibers, whose ability to transmit mechanical energy to nearby fibers is poor, hence shattering is avoided. Rigid fibrous substrate material is made from tangled fibers of silicon dioxide (also called silica or $SiO_2$) and aluminum oxide (also called alumina or $Al_2O_3$) sintered together as a non-isotropic material. The aluminum oxide content can vary anywhere from 0 to 100%. Since the substrate material is already an oxide, it does not react with atomic oxygen in low Earth orbit, unlike thin metal or polymer mirrors. Fibrous substrates of the type described here are very stiff (Young's modulus is about $6.21 \times 10^8$ nt/m$^2$ and the compressive strength is about $3.94 \times 10^6$ nt/m$^2$), and undergoes very small shrinkage and expansion due to thermal effects (coefficient of expansion = 6.3 to $79.2 \times 10^{-7}$ cm/cm-C°). By contrast, flexible metal mirrors can change there figure considerably as a function of temperature. When one side of a fibrous substrate is coated with a sealer and a suitable glassy substance, such as fused silica or borosilicate glass, is deposited on the sealed surface, fine mirrors can be made. It should be noted that although wax coatings have been described by R. L. Jones (1991, U.S. Pat. No. 4,990,378) for sealing fibrous substrates, here we are dealing with a sealer of ceramic composition which is capable of being fired in a kiln at high temperatures. Mirrors made in this way outgas quickly, thereby preventing annoying virtual leaks which can result in condensation of gaseous species onto optical surfaces when the mirror is cold and pointed toward dark space. Thus, the condensation problem of inflatable mirrors is avoided. Experiments have shown that when a 1 cm × 5 cm × 5 cm slab of fibrous substrate material is place in a vacuum chamber with a volume of 14 liters and pumped down at a rate of 200 l/sec, the chamber pressure reaches $2 \times 10^{-4}$ torr in 1 minute, and the ambient pressure at low Earth orbit (approximately $10^{-5}$ torr) is reached in eight minutes. Since outgassing of fibrous substrate space mirrors can take place during warm parts of its flight plan, condensation of gases on optical surfaces during cold operations can be completely avoided, in contrast to inflatable mirrors.

OBJECTS AND ADVANTAGES

Accordingly, several objects and advantages of the present patent are:

1) to provide a mirror which is exceptionally lightweight;
2) to provide a mirror which outgases quickly under space vacuum conditions;
3) to provide a mirror which is rigid even when it has extremely large dimension;
4) to provide a mirror which has an extremely low coefficient of thermal expansion;
5) to provide a mirror which is shatter resistant to micrometeoroid impacts;
6) to provide a mirror which is resistant to atomic oxygen corrosion from the tenuous atomic oxygen atmosphere in low Earth orbit.

DRAWING FIGURE

FIG. 1 is an oblique view of layers comprising the ultralight mirror.

Reference Numerals in Drawing 10 fibrous substrate
20 sealant layer
30 glassy layer
40 reflective layer
50 protective overcoat

DESCRIPTION

FIG. 1

A fibrous substate 10 for an ultralight mirror can be formed in several ways. The simplest way to obtain a substrate is to purchase the bulk material and then machine it to specifications via a diamond tool. Non-diamond tools can also be used, but they wear out very quickly. Lockheed Missiles and Space Company, Inc. of Sunnyvale Calif. and Ceramic Fiber Fabrication of Yucca Valley Calif. are both suppliers of bulk silica-alumina fibrous substrates. When ordering fibrous silica-alumina substrates it is essential to specify the coefficient of thermal expansion desired, since a thermal expansion match will be required between the substrate and subsequent applied layers on the mirror surface. The coefficient of thermal expansion $\alpha$ (measured in units of cm/cm/C°) empirically depends on the weight percentage of alumina, %, according to the approximate law $$\alpha = [9/5][3.5745 + 0.489024(\%) - 0.000848651(\%)^2] \times 10^{-7}.$$

This same law also gives the coefficient of thermal expansion in units of in/in/F° when the factor of 9/5 to the right of the equal sign is omitted. Another important parameter required when ordering a fibrous silica-alumina substrate is its density, since this quantity will ultimately determine a substrates porosity and weight. A material having a density of 0.19 gms/cm$^3$ (12 lbs/ft$^3$) and 48.2 weight percent of alumina has proven to be an excellent substrate. Typically, the ratio of the substrate diameter to its thickness will be in the range of 4 to 62. However, other diameter to thickness ratios are possible. The vendors mentioned above can also cast the substrate material into its final shape so that no machining to the final figure is required. Since fibrous silica-alumina substrates are often microstructurally non-isotropic materials, it is essential that a mirrors final figure of revolution be generated so that the tangent plane to the bottom of the dish is perpendicular to the average fiber direction. By this means the mirror's expansion will be uniform in all its lateral dimensions. Finally, if one does not wish to purchase a prefabricated substrate, a custom substrate can be made from fibers supplied by vendors like Ceramic Fiber Fabrication of Anaheim Calif. These fibers can be made into disks according to procedures found in the literature (J. F. Creedon, Y. D. Izu, W. H. Wheeler, "Strength and Thermal Stability Improvement of Fibrous Ceramic Composites," SAMPE Quarterly, Oct. 1983, p. 9–15). However, it should be noted that a little shrinkage can occur during the required kiln baking of the substrate during its fabrication from raw materials.

Next, it is necessary to seal the surface pores of fibrous substrate 10 by applying a sealant layer 20. Without sealant layer 20 a rough surface will result which is frequently, but not always, unacceptable for astronomical and other precision optical work. Sealant layer 20 is made by spraying fibrous substrate 10 with a mixture made of one part glaze with three parts of ceramists slip by volume. The coating should then be allowed to completely dry, a process which takes about 48 hours. The glaze should be of the same type that is used to fabricate the next layer, which is a glassy layer 30. The slip is a smooth, thick, liquid made by a multistep procedure. The specific method used by the applicant, which has produced a good result, is described here. First, between 85 and 100 gms of sodium silicate are dissolved in about 946 cm$^3$ of cold water (approximately 10° C. to 20° C.). Next, a second solution is prepared consisting of about 28 gms of soda ash (anhydrous sodium carbonate; $Na_2CO_3$) dissolved in 473 cm$^3$ of hot water (about 50° C.). Both solutions are then added to 22,712 cm$^3$ of water and mixed for about 10 minutes. In all cases tap water is used. The soda ash solution acts as a water softener and in some localities, where the water is already soft, it may be possible to leave the soda ash solution out of the slip mixture. After mixing the final liquid volume, about 45.36 Kg of slip clay are slowly added. The applicant has successfully used White Diamond brand low fire white slip can made by Industrial Minerals Co., Sacramento Calif. The mixture should be stirred while adding the clay until a smooth slurry results.

Once sealant layer 20 is dry, a slurry graze may be sprayed on top. After firing, this last layer will form a glassy layer 30 which is continuous over the surface. Subsequent glaze spraying and firing can be used to increase the thickness of glassy layer 30, which can then be ground to the final figure and polished to a fine optical quality finish using the usual techniques documented in the literature (Topical Meeting on the Science of Polishing, Technical Digest, Apr. 17, 1984, Monterey, Calif. sponsored by the Optical Society of America). A little figure adjustment is necessary since glassy layer 30 can slump, or puddle, at the low point of the mirror during firing. Naturally, this is not a problem for flat mirrors. If the slurry glaze is of a borosilicate type with a Corning glass number of 7050, then its coefficient of thermal expansion will match that of a fibrous silica-alumina substrate with 48.2 percent by weight of alumina and a density of 0.19 gms/cm$^3$. Since the sealant layer is also made from the same glaze, temperature excursions will cause all the layers to expand and contract together, thus preventing severe warping of the figure or cracking due to thermal mismatch. When 7050 borosilicate glaze is used, firing should proceed at a temperature between 1000° to 1260° C. It should be noted that glazes other than the 7050 borosilicate type have been used. For example, GL 617 brand glaze manufactured by Duncan Ceramics of Fresno Calif. and fired at 1027° C. has produced acceptable surfaces on some fibrous substrates.

Next, a reflective layer 40 can be deposited on the polished glassy layer 30. Reflective layer 40 is usually very thin, about a few hundred angstroms to a few microns thick, and is essentially elastic so that it follows the thermal expansions and contractions of the substrate and layers below it. Typically reflective layer 40 is a metal like aluminum or silver, but other metals or even nonmetallic multilayer interference reflectors are possible. Reflective layer 40 can be made by vacuum evaporation methods (L. I. Maissel and R. Glang, Handbook

*of Thin Film Technology*, McGraw-Hill, N.Y., 1970), chemical methods (T. W. Webb, *Celestial Objects for Common Telescopes (Vol. 1)*, Dover, N.Y., 1962, p.251), or other methods.

When corrodible materials are used for reflective layer 40 (such as silver in terrestrial or even low Earth orbit environments), it is wise to apply a protective overcoat 50 to the reflective layer. Protective overcoat 50 is a thin film of a more or less transparent, hard, and chemically inert, material. Silica or berillia (BeO) have been used for this purpose in the past, but other materials are also possible. The coatings can be made by chemical vapor deposition, electron gun evaporation, or other methods as described in the Handbook of thin film Technology cited above. Overcoating also imparts some wear resistance to the mirror surface as well.

OPERATION

FIG. 1

Several precautions must be taken before the ultralight mirror design presented here is used in space based situations. Once the mirror is deployed in the vacuum of space, at least 8 minutes are required for the substrate to outgas down to the ambient pressure at low Earth orbit. This outgassing operation should proceed with the mirror optics pointed in a "warm direction," such as toward the Earth. In that case oxygen, nitrogen, carbon dioxide, water, and other atomic and molecular species, escaping from the mirror substrate and other components of a space telescope, will not condense on the mirror surface and will be lost to space instead. This precaution is particularly important for ultraviolet and infrared astronomy, where observation at some wavelengths can be hampered by the presence of mirror contamination (J. A. Muscari, *Nonmetallic Materials Contamination Studies, Final Technical Report*; NASA-CR-163890, Dec. 16, 1980).

In addition to the initial outgassing operation, periodic cleaning of contaminants from the mirror surface may be required due to venting of gases for attitude control and long term outgassing from certain materials like plastics, tapes, and elastomers. Cleaning in orbit can be achieved by bombarding the mirror with a jet of carbon dioxide snow flakes (R. R. Zito, "Removal of Adsorbed Gases with Carbon Dioxide Snow," SPIE vol. 1494, p. 427–433).

Finally, the mirror should be protected from micrometerorid impacts when not in use. However, micrometeoroid damage to the type of mirror described in this patent is minimal since the substrate is not solid. Incident particles will just punch a tiny hole through the thin, glassy, surface crust and imbed themselves in the tangle of fibers below without cracking the substrate.

SUMMARY, RAMIFICATION, AND SCOPE

Accordingly, the reader will see that the ultralight mirror of this invention combines lightweight, rigidity, and low thermal expansion, with the special properties required for space deployment. These latter properties include rapid outgassing, resistance to atomic oxygen corrosion, and resistance to shattering by micrometeoroids.

Although the description above contains many specificities, these should not be construed as limiting the scope of the invention but as merely providing illustrations of some of the presently preferred embodiments of this invention. For example, instead of grinding the final figure into glassy layer 30, it is possible to spin the mirror in a kiln during firing. Rotating liquids (like molten glass) automatically develop a parabolic surface (J. C. Slater and N. H. Frank, *Mechanics*, McGraw-Hill, N.Y., 1947, p. 236), thereby preventing puddling at the low point of the mirror.

Another important variation involves creation of glassy layer 30 by chemical vapor deposition instead of spraying on a slurry of glass particles and then fusing the surface into a glassy layer in a kiln. Chemical vapor deposited glass can be laid down to any convenient thickness, and bubbleless glass slabs over six centimeters thick are commonly grown for telescope mirrors. Other methods of fabricating glassy layer 30 include fusing a thin piece of glass to the surface of the substrate. It is even be possible to make glassy layer 30 out of plastics, or other smooth materials which can be polished, when the ambient mirror environment allows such materials. Other methods of making glassy layer 30, not described here, may also be possible.

Sometimes glassy layer 30 can be deposited directly onto fibrous substrate 10 without sealant layer 20. Whether this can be done depends on the exact composition of the glass slurry or chemical vapor deposited glass used, the size and number of voids in the surface of fibrous substrate 10 and the quality of the surface required. A description of a mirror design which does not employ sealant layer 20 can be found in the literature (R. R Zito, "A Method of Making Ultralight Primary Mirrors," *SPIE* vol. 1494, p. 491–497). Also, the composition of the mixture used to make sealant layer 20 can also vary, especially in response to local differences in water chemistry.

Finally, it is often possible to eliminate protective overcoat 50. This is particularly appealing when the mirror is exposed to a non-corrosive environment, or when reflective layer 40 is inert to the environment. Elimination of protective overcoat 50 has the added advantage of eliminating small phase errors caused by the passage of radiation through protective overcoat 50.

Thus the scope of the invention should be determined by the appended claims and their legal equivalents, rather than by the examples given.

I claim:
1. A mirror comprising;
   a) a sintered fibrous substrate, composed of tangled silica and alumina fibers, containing voids,
   b) a sealant layer containing clay deposited upon said sintered fibrous substrate, whereby the surface voids of said sintered fibrous substrate are sealed,
   c) a glassy layer deposited upon said sealant layer, and
   c) a reflective layer deposited upon said glassy layer.
2. A mirror comprising;
   a) a sintered fibrous substrate, composed of tangled silica and alumina fibers,
   b) a sealant layer, composed of glaze and clay, deposited upon said sintered fibrous substrate so that the bottom of said sealant layer contacts the top of said sintered fibrous substrate,
   c) a glassy layer deposited upon said sealant layer, and
   d) a reflective layer deposited upon said glassy layer.
3. A mirror comprising;
   a) a sintered fibrous substrate, composed of tangled silica fibers and about 48.2 weight percent of tan- gled alumina fibers, so as to yield a density of about 0.19 gms/cm$^3$, b) a sealant layer, composed of glaze, water, sodium silicate, soda ash, and clay, deposited upon said sintered fibrous substrate so that the bottom of said sealant layer contacts the top of said sintered fibrous substrate, c) a glassy layer made of borosilicate glass and deposited upon said sealant layer, and d) a reflective layer made of aluminum deposited upon said glassy layer.

* * * * *